Mar. 6, 1923.
J. R. MITCHELL
1,447,395
DRAWBAR AND YOKE CONNECTION
Filed Mar. 20, 1922
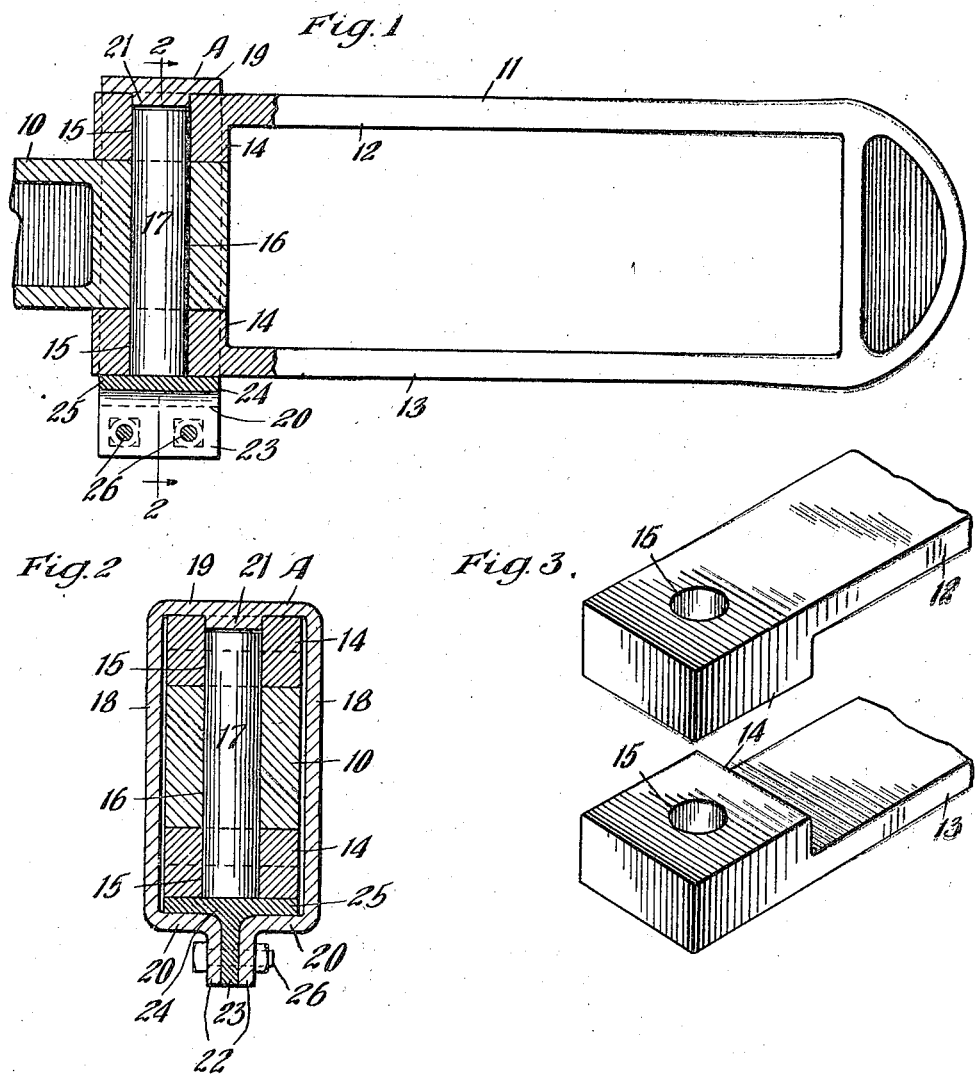
Witnesses
Wm. Geiger
Inventor
John R. Mitchell
By Geo. I. Haight
His Atty.

Patented Mar. 6, 1923.

1,447,395

UNITED STATES PATENT OFFICE.

JOHN R. MITCHELL, OF CHICAGO, ILLINOIS, ASSIGNOR TO WILLIAM H. MINER, OF CHAZY, NEW YORK.

DRAWBAR AND YOKE CONNECTION.

Application filed March 20, 1922. Serial No. 545,021.

*To all whom it may concern:*

Be it known that I, JOHN R. MITCHELL, a citizen of the United States, residing at Chicago, in the county of Cook and State of Illinois, have invented a certain new and useful Improvement in Drawbar and Yoke Connections, of which the following is a full, clear, concise, and exact description, reference being had to the accompanying drawings, forming a part of this specification.

This invention relates to improvements in drawbar and yoke connections.

It is very desirable in operating railroad cars, particularly passenger cars, to have a detachable pivotally connected drawbar and yoke so arranged that the drawbar can be taken out without taking down the entire draft rigging. On certain equipment, it is possible to use a headed pin which can be removed upwardly while the yoke and other parts of the draft rigging remain in place but such instances are comparatively rare on account of the lack of space above the drawbar and yoke. On a large majority of passenger cars, if a detachable pin or key is employed to connect the drawbar and yoke, the pin or key must be inserted from beneath, in which case additional means must be provided for holding the pin up in position. It has been suggested heretofore to apply a nut to the top of a bolt but this is unsatisfactory on account of the lack of space which prevents the use of the necessary wrench in applying the nut.

One object of my invention is to provide a detachable pin or key connection for yoke and drawbar, and more particularly, passenger equipment, wherein the pin or key is readily insertible and removable from the bottom, and simple means provided for retaining the pin or key in place.

More specifically, the object of my invention is to provide a detachable pivotal connection for a drawbar and yoke wherein the pin may be inserted from the bottom and effectively held in proper place by simple and inexpensive means.

In the drawing forming a part of this specification, Figure 1 is a part vertical, sectional view, part elevational view of a portion of a drawbar and yoke showing my improvements in connection therewith. Figure 2 is a vertical, sectional view corresponding to the section line 2—2 of Figure 1. And Figure 3 is a detail perspective of the forward ends of the arms of the yoke.

In said drawing, 10 denotes the shank of a coupler or drawbar and more particularly such a coupler or drawbar as used on passenger equipment. The yoke is indicated at 11, the same having top and bottom arms 12 and 13, each provided at the forward end thereof with an enlarged heavy boss 14—14. In the instance shown, the inner end of the drawbar shank is adapted to be inserted between the ends of the yoke arm and the bosses on the latter are provided with vertically alined cylindrical openings 15—15 and the inner end of the drawbar shank with a corresponding alined cylindrical opening 16.

The pivotal connection is effected by a heavy cylindrical pin 17, the length of which is made slightly shorter than the over-all vertical height of the overlapping portions of the drawbar and yoke. In this manner it is evident that the pin 17 will be put under double shear and will allow for relative pivotal movements of the drawbar and yoke. The pin obviously may be inserted from the under side.

To hold the pin 17 in operative position, I provide the following arrangement. Encircling the overlapping parts of the drawbar shank and yoke is a band designated generally by the reference character A. Said band A is provided with side walls 18—18, top wall 19, and inturned bottom ends 20 providing the bottom wall of the band. The top wall 19 of the band is provided on the inner side thereof with a relatively short or shallow lug 21 adapted to enter the upper opening 15 of the yoke. The vertical distance between the top wall 19 and the bottom wall provided by the inturned ends 20 of the band, exceeds the vertical over-all height of the overlapped portions of the drawbar and yoke by an amount slightly in excess of the length of the lug 21. Also the distance horizontally between the side walls 18—18 is made slightly in excess of the width of the drawbar shank and yoke ends so as to accommodate the pivotal movements without danger of spreading or distorting the band.

The bottom inturned ends 20 of the band are bent downwardly opposite each other as indicated at 22—22 to provide vertical flanges which are separated and adapted to go therebetween, is the web 23 of a T-shaped filler 24, the horizontal flanges 25—25 of which are disposed between the bottom of the band and the bottom face of the yoke. The filler 24 is insertible lengthwise of the yoke and is held in position by any suitable means, such as the bolts and nuts 26—26.

In assembling the parts, the band is first slipped loosely over either the drawbar shank or the yoke to one side of the alined vertical openings 15 and 16. The pin 17 is then inserted vertically and temporarily held in position by any desired means. The band A is then slid into position so as to allow the lug 21 thereof to drop into the top opening 15. The key 24 is then inserted longitudinally, thus holding the band tight against the top of the yoke and preventing the lug 21 from coming out. The filler is then secured by the bolts 26. In this manner, the band A is prevented from moving longitudinally of the yoke and the pin 17 is adequately supported from the bottom. The yoke and drawbar are disconnected by reversing the sequence of the foregoing described operations.

With my arrangement, it will be seen that the parts may be applied even though there is only a very little clearance above the top of the yoke, an inch or two being sufficient. Furthermore, the only tool required is a wrench and this is used on the under side of the yoke where there is always ample room to manipulate the wrench. The arrangement is simple, relatively inexpensive and provides for the desirable detachable pivotal connection.

I claim:

1. In a connection for a drawbar and yoke having alined vertically extending openings, the combination with a key within said openings; of a band arranged to encircle the keyed portions of the yoke and drawbar, said band having a relatively short lug on the inner face of the top wall thereof adapted to enter the corresponding adjacent top opening to thereby prevent the band from longitudinal movement with respect to the yoke and drawbar; a removable filler located between the bottom of the band and the bottom of the keyed portions of the yoke and drawbar; and means for holding said filler in position.

2. In a connection for a drawbar and yoke, having spaced arms with the shank of the drawbar fitting therebetween, said arms and the shank having vertically alined openings, the combination with a key disposed within said openings; of a band encircling the yoke arms and drawbar shank, said band having a relatively short lug on the inner face of the top wall thereof adapted to enter the opening in the top arm of the yoke; a removable filler interposed between the bottom of the band and the bottom arm of the yoke; and means for holding said filler in position.

3. In a connection for a drawbar and yoke having vertically alined cylindrical openings, the combination with a cylindrical pin disposed within said openings to permit pivotal movement between the drawbar and yoke; of a band encircling the overlapping portions of the drawbar and yoke, said band having a cylindrical relatively short lug on the inner face of the top wall thereof adapted to enter the corresponding adjacent top opening; a removable filler located between the bottom of the band and the bottom of the overlapped portions of the yoke and drawbar; and means for holding said filler rigid with the band.

4. In a connection for a drawbar and yoke having spaced arms with the shank of the drawbar fitting therebetween, said shank and the arms of the yoke having vertically alined cylindrical openings, the combination with a cylindrical pin disposed within said openings; of a band encircling the drawbar shank and yoke, said band having a relatively short cylindrical lug on the inner face of the top wall thereof arranged to enter the opening in the top arm of the yoke; a removable filler interposed between the bottom of the band and the bottom arm of the yoke; and means for securing said filler to the band.

5. In a device of the character described, the combination with a yoke having vertically spaced arms, the end of said arms being provided with vertically alined cylindrical openings; of a drawbar shank adapted to fit between the free ends of the arms of said yoke and provided with a cylindrical opening alined with the yoke openings; of a band encircling the yoke and drawbar shank, said band having a lug on the top thereof arranged to enter the opening in the top arm of the yoke; a cylindrical pin disposed within said alined openings; a T-shaped filler interposed between the bottom of the band and the bottom arm of the yoke; and means for detachably connecting said filler with the band.

In witness that I claim the foregoing I have hereunto subscribed my name this 6th day of March, 1922.

JOHN R. MITCHELL.

Witnesses:
 UNA C. GRIGSBY,
 ANN BAKER.